UNITED STATES PATENT OFFICE.

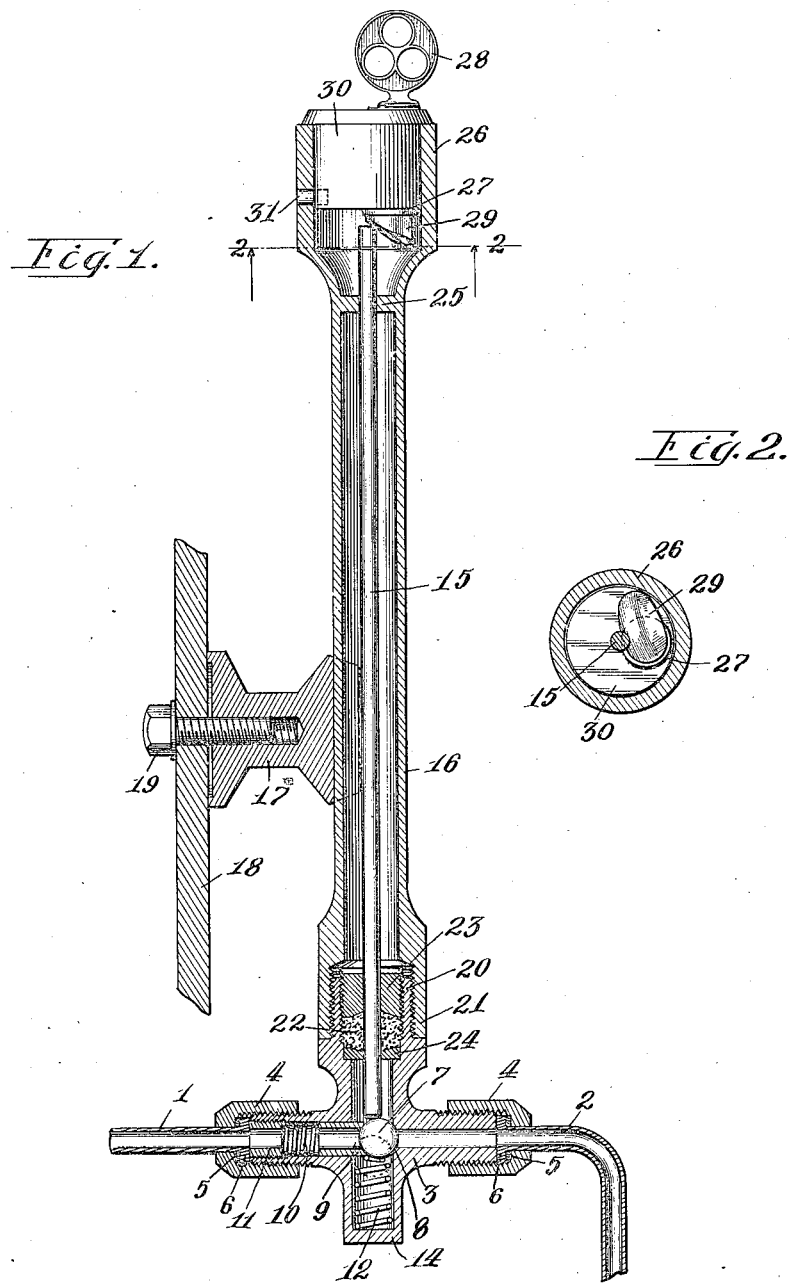

JOHN F. BLYTHING, OF CHICAGO, ILLINOIS.

LOCK-VALVE.

1,153,189.

Specification of Letters Patent.

Patented Sept. 14, 1915.

Application filed October 9, 1912. Serial No. 724,702.

*To all whom it may concern:*

Be it known that I, JOHN F. BLYTHING, a citizen of the United States, residing at Chicago, in the county of Cook and State of Illinois, have invented certain new and useful Improvements in Lock-Valves, of which the following is a description.

My invention belongs to that general class of devices known as lock valves, and relates particularly to a suitable valve and key controlled operating means therefor. The device is particularly designed for use on automobiles, motor boats, etc., for locking the valve controlling the supply of gasolene, but is not, however, confined to such use, as the same may be employed wherever found applicable.

The invention has among its objects the production of a device of the kind described that is simple, efficient, convenient, and satisfactory, that will not easily get out of order, and that cannot be operated by an unauthorized party tampering with the same.

To this end my invention consists of the novel construction, arrangement and combination of parts herein shown and described, and more particularly pointed out in the claims.

In the drawings, wherein like reference characters indicate like or corresponding parts, Figure 1 is a sectional view of my improved device, and Fig. 2 is a sectional view taken substantially on line 2, 2 of Fig. 1.

Referring to the drawings, in which the preferred form of my device is shown, 1 and 2 represent the pipes for conducting the gasolene or other fluid from a source of supply to the desired point. One pipe is connected to the inlet and the other to the outlet of a suitable valve casing 3. These parts may be connected in any suitable manner. As shown, the caps 4 maintain the flanges 6 on the pipes against displacement, packing 5 being provided if desired. The casing outlet is controlled by a valve member, preferably in the form of a spherical ball 7, adapted to coöperate when closed with a valve seat 8 in the casing. When the device is locked the valve member 7 is maintained upon its seat by a member 9, which is also preferably provided with a valve seat, which member is maintained in position when the valve is closed, by a spring 10, or the equivalent, bearing against a collar or stop 11. The casing is provided with an extended part 14, having a recess therein, in which is arranged a spring 12, or its equivalent, which is adapted to normally raise the valve member 7 and maintain it in position in alinement with the outlet, or its valve seat 8. The valve is opened by depressing or pushing the valve member 7 into the recess in the part 14 against the pressure of the spring 12, and closed by permitting it to return to the position indicated in Fig. 1.

For operating the valve, I provide a longitudinal movable rod 15, which is preferably arranged within a casing 16, which may be secured to the vehicle part 18 when the device is used on an automobile by a bracket 17, and bolt or screw 19. The bracket 17 is secured to the casing 16 in such a way that it cannot be easily pulled or broken off. While the extended part 16 may be made integral with the casing 3, I preferably form the same separate and screw the same upon the extended part 20 of the casing, the extended part 16 being formed as at 21 to embrace the part 20.

In order to prevent any leakage of gasolene or other fluid about the rod 15, from the valve casing 3, packing 22 may be arranged as shown. To maintain the packing in position, parts 23 and 24 are arranged as shown. It is, of course, understood that any equivalent arrangement may be provided. The size or length of the extended part 16 depends upon the preference of the user, the same being sufficiently long so as to bring the locking device to a point where it may be conveniently reached. As shown, the casing or extended part 16 is provided with a guide 25 for the rod 15, and is enlarged slightly as at 26. Within the enlarged part is arranged the locking mechanism, and in this connection it may be stated that I preferably use a Yale or similar lock, in which practically no two locks may be operated by the same key.

The locking mechanism is not shown in detail, 30 being an outer casing, within which is arranged the locking cylinder 27, which is turned or operated by the key 28. Upon the rotatable cylinder 27, which is commonly known as the lock cylinder, I arrange a cam 29. This cam is so designed that when the cylinder 27 is turned with the key 28, the rod 15 is depressed, thereby depressing or moving the valve 7, and permitting the passage of fluid through the valve casing. As soon as the lock is turned back the spring 12 forces the valve member 7 back to its position, and raises the rod 15. In the lock arranged as shown, the key cannot be removed unless the lock cylinder 27 is in position so that the cam does not bear upon the rod 15. When, however, it is desired to open the valve, the key is inserted and the cam turned, opening the valve as described. When the valve member 7 is depressed, for example, as illustrated by the dotted lines in Fig. 1, the coöperating member 9 is moved by the depressing of the valve member. As soon as the valve, however, is raised by the spring 12, the spring 10 forces the member against the valve and maintains it upon its seat 8.

The device is particularly designed to prevent the unauthorized use of automobiles, motor boats and the like, but it is applicable for other uses, as previously mentioned. When an automobile or boat is so equipped the owner or operator of the machine turns his key, thereby locking the valve so that the vehicle cannot be stolen or used, either when on the street, in the garage, or in the case of a boat when docked or anchored. It is impossible for anyone to operate the key or a pass key and unlock the device, returning the key with the same unlocked, as the key must be kept in the lock in order to keep the valve open. This is important where an automobile is in a garage and the manager has a pass key to several machines. In this case several machines cannot be unlocked by an employee in possession of a key authorized for use on another machine.

Having thus described my invention, it is obvious that various immaterial modifications may be made in the same without departing from the spirit of my invention, hence I do not wish to limit myself to the exact form, arrangement, construction, or combination of parts herein shown and described, or uses mentioned.

What I claim as new and desire to secure by Letters Patent is:—

1. In a device of the kind described and in combination, a suitable valve casing provided with an inlet and outlet, a controlling valve in said outlet, means arranged in the inlet for maintaining said valve on its seat, comprising a tubular sleeve slidably carried by the casing, a fixed tubular sleeve arranged in said inlet, and a spring member arranged to abut against both of said sleeves, and normally force the slidable sleeve in the direction of the outlet of the casing, said casing provided with an extended chambered part at one side, a longitudinally movable valve operating rod arranged in the chamber in said part and projecting into the valve casing, means arranged about said rod for preventing the escape of fluid from the casing into said chamber, key-controlled mechanism arranged at the end of said chambered part for operating said rod, including a lock casing secured in said part, and a rotatable barrel arranged therein and provided with a cam member on its inner end arranged eccentrically the rod and only contacting with said rod at the end thereof.

2. In a device of the kind described and in combination, a suitable casing provided with an inlet and outlet, and with a valve seat at said outlet, said casing having a chambered extended part at one side and a recess therein at the opposite side, a spherical valve member arranged in said casing, means for normally maintaining said valve member in alinement with the valve seat, means for resiliently maintaining said valve on its seat, means for displacing the valve member and retaining the same in said recess in position to the resilient means contained therein, comprising a longitudinal movable rod arranged in the chambered part and extending into the casing in contact with the valve member, a stuffing box arranged about said rod between said casing and extended part, a rotatable cam member positioned at the end of the rod and having a cam face in contact with the rod end, and means for rotating said cam, including locking means secured thereto.

In testimony whereof, I have hereunto signed my name in the presence of two subscribing witnesses.

JOHN F. BLYTHING.

Witnesses:
Roy W. Hill,
Charles I. Cobb.